United States Patent
Aniban, Jr.

(10) Patent No.: US 7,334,536 B2
(45) Date of Patent: Feb. 26, 2008

(54) POP-UP SEWER BACKUP INDICATOR

(75) Inventor: Raymond Aniban, Jr., 1760-B Palolo Ave., Honolulu, HI (US) 96816

(73) Assignee: Raymond Aniban, Jr., Ewa Beach, HI (US)

( * ) Notice: Subject to any disclaimer, the term of this patent is extended or adjusted under 35 U.S.C. 154(b) by 0 days.

(21) Appl. No.: 11/287,971

(22) Filed: Aug. 3, 2005

(65) Prior Publication Data

US 2007/0028831 A1    Feb. 8, 2007

(51) Int. Cl.
*G01F 23/30* (2006.01)

(52) U.S. Cl. ........................ 116/228; 73/319

(58) Field of Classification Search ............ 116/109, 116/110, 227, 228; 73/319, 322; 137/558, 137/559

See application file for complete search history.

(56) References Cited

U.S. PATENT DOCUMENTS

| | | | |
|---|---|---|---|
| 1,489,957 A * | 4/1924 | Morton ........................ 73/315 |
| 2,818,086 A * | 12/1957 | Foth ............................ 138/89 |
| 3,166,041 A | 1/1965 | Caggainello | |
| 3,407,660 A * | 10/1968 | Nusbaum ...................... 73/311 |
| 3,960,107 A * | 6/1976 | McCloskey ................. 116/228 |
| 4,081,638 A * | 3/1978 | Thorn et al. .............. 200/84 R |
| 4,392,128 A * | 7/1983 | Young et al. ............... 340/616 |
| 5,006,834 A * | 4/1991 | Fountain ..................... 340/625 |
| 5,269,184 A * | 12/1993 | Nishida ........................ 73/322 |
| 5,600,998 A * | 2/1997 | Dean, Jr. ...................... 73/309 |
| 5,687,761 A | 11/1997 | Langes | |
| 5,862,775 A | 1/1999 | Stroud | |
| 5,950,487 A * | 9/1999 | Maresca et al. .............. 73/293 |
| 6,482,319 B2 * | 11/2002 | Houck et al. ............... 210/282 |

* cited by examiner

Primary Examiner—R. Alexander Smith

(57) ABSTRACT

An improved sewer backup indicator. The sewer backup indicator is installed into a sewer cleanout cap housing which comprises a pop-up device that detects and holds the detection of a back up in the sewer system, which is due to number of reasons. This invention helps to determine a problem in the sewer system and where the problem would most likely be making it quicker to resolve the problem so that a sewer spill could be prevented. In general, this invention will prevent sewer spills, law suits, and prevent the endangerment of our wild and aquatic life. My invention is basically is to protect our environment and our water supply.

12 Claims, 3 Drawing Sheets

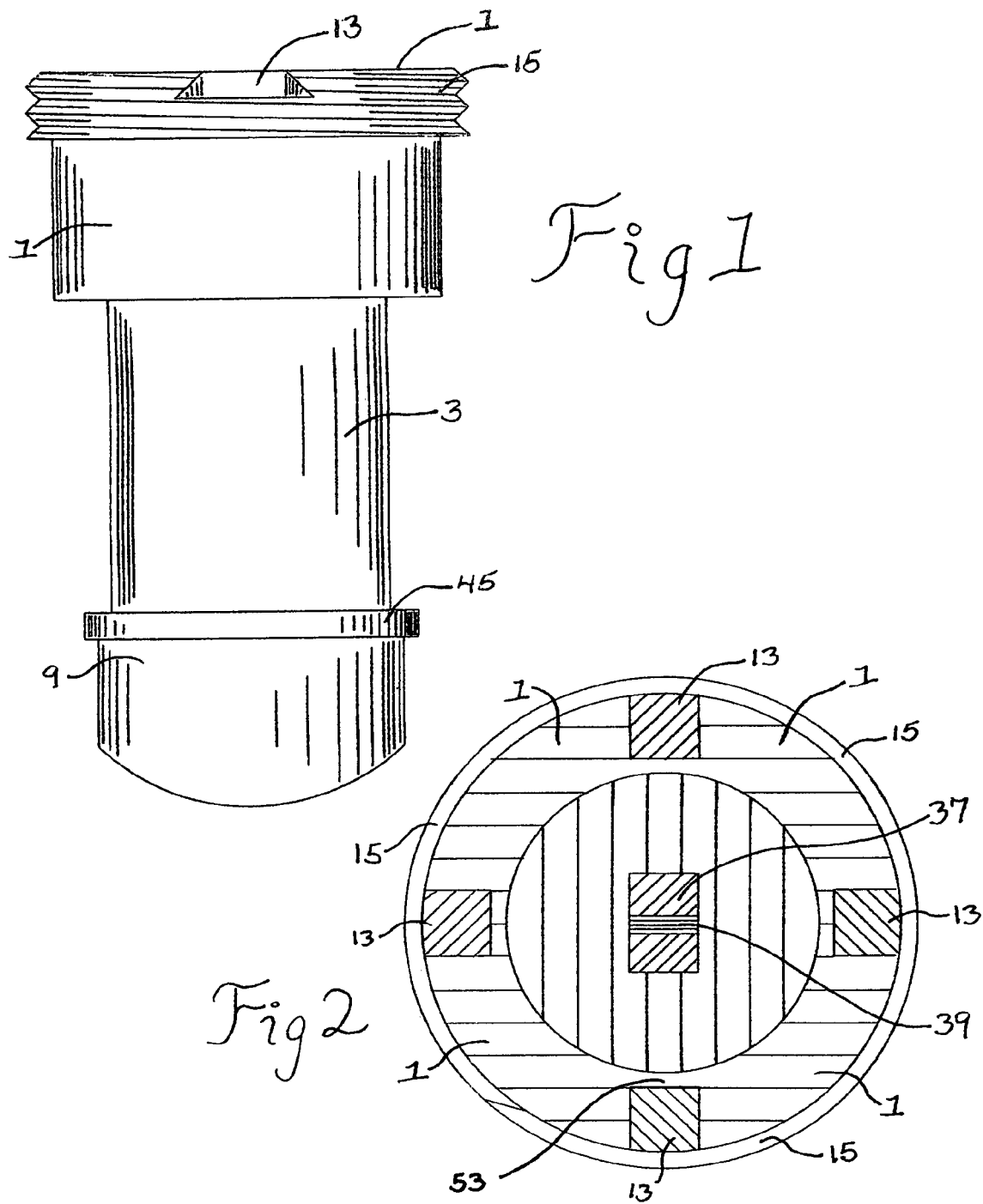

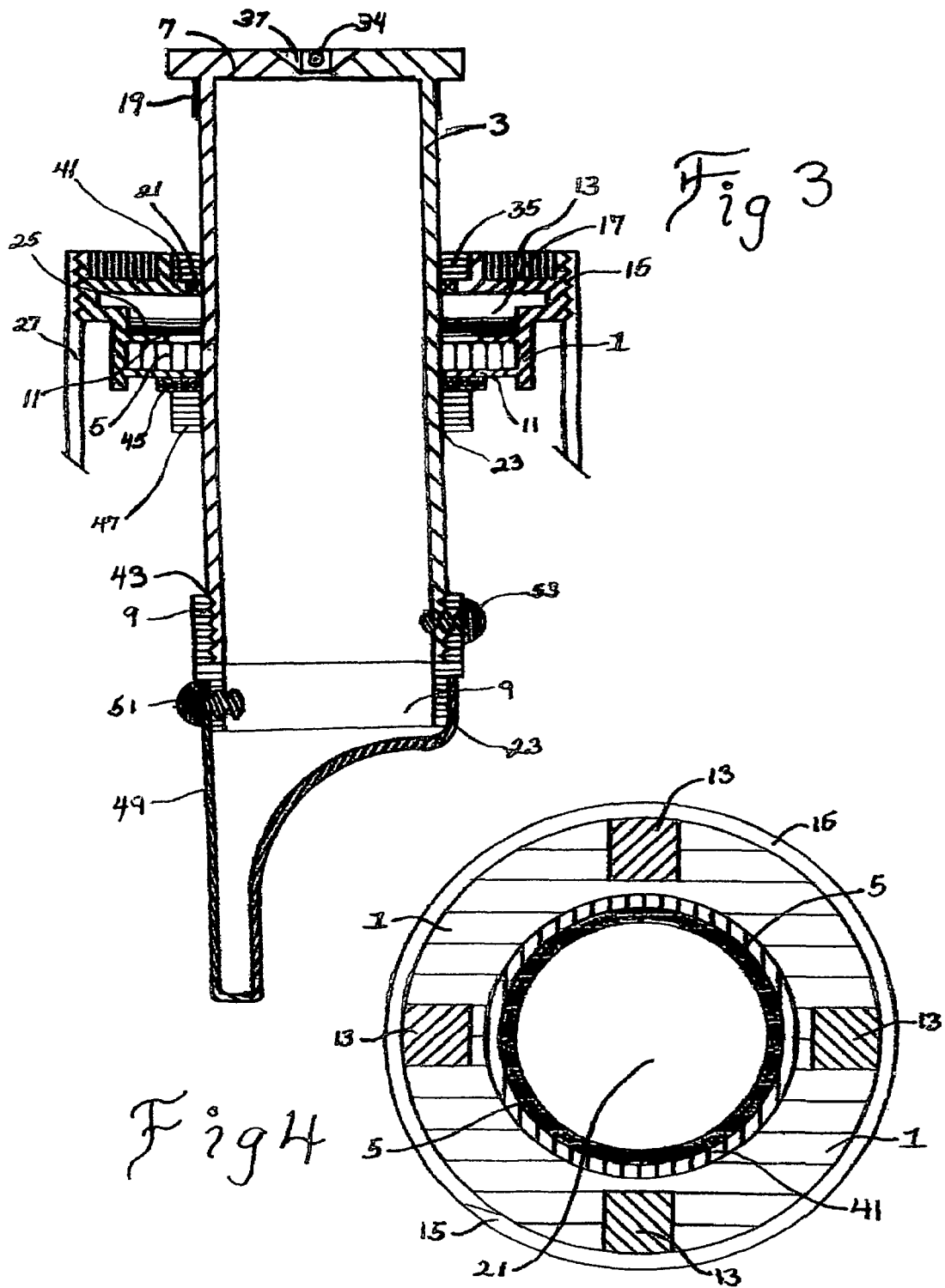

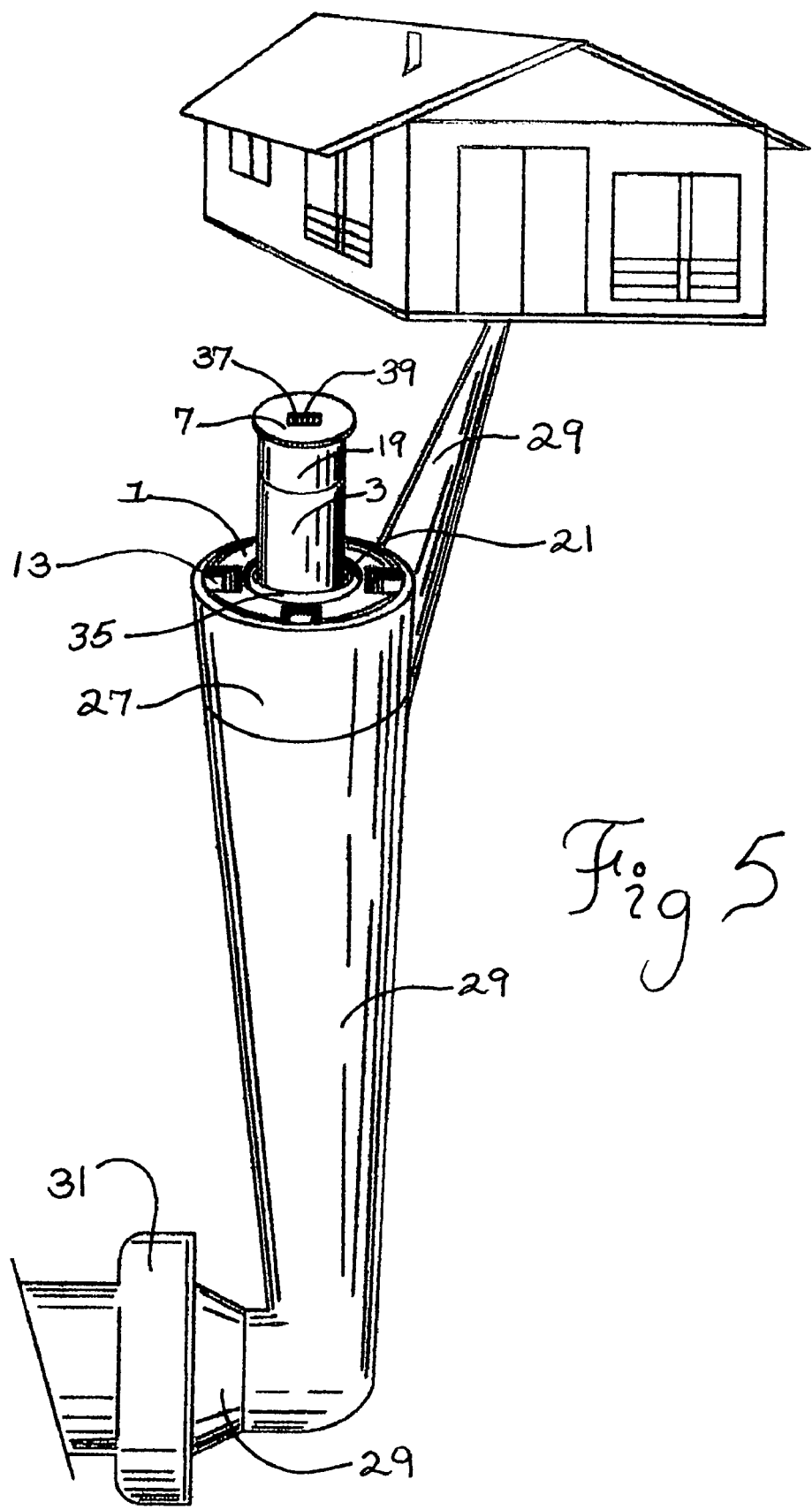

POP-UP SEWER BACKUP INDICATOR

CROSS-REFERENCE TO RELATED APPLICATION

| SEWER BACKUP INDICATOR APPARATUS: | | |
|---|---|---|
| App. No. 727,057 | Patent Number: U.S. Pat. No. 5,687,761 | Nov. 18, 1997 |
| SEWER BACKUP INDICATOR: | | |
| App. No. 685,496 | Patent Number: U.S. Pat. No. 5,862,775 | Jan. 26, 1999 |
| | Patent Number: U.S. Pat. No. 3,166,041 | Jan. 19, 1965 |

BACKGROUND

1. Field of the Invention

This invention relates to sewer cleanout caps specifically to an improved sewer clean out cap.

2. Description of the Prior Art

Numerous styles of cleanout caps have been provided in prior art, but none provide a continuous day and night detection or even hold that detection if water levels recede to its normal level. This makes it difficult to identify an obstruction in a sewer line once the water level returns to normal or to a level that is not detectable in prior art. When the sewer system has a back up a sewer department crew needs to first find the location of the problem. Normally a number of sewer manholes may need to be opened releasing raw sewage into our environment that often enters into storm drains. By using my invention problems in the sewer system can be identified at a much earlier stage. With the prior art, such as Langes U.S. Pat. No. 5,687,761, Stroud U.S. Pat. No. 5,862,775, a person would need to identify the backup as it is occurring. Due to the fact that sewers don't necessarily back up all at once but most often at a gradual progress, backups may occur for weeks or even months before an indication is identified in interior plumbing. By identifying the first indication that sewer water has risen, sewer spill and other sewer related problem decreases.

BACKGROUND OF THE INVENTION

This invention relates to a sewer cleanout cap and sewer backup indicators. The sewer cleanout is a part of the sewer system that connects to the sewer lateral that is connected to a main sewer line. Cleanouts are always ground level in which it may be serviced when emergencies and maintenance are needed.

The cleanout is usually within the property line of a home, business or property, which makes it the first point of plumbing that could be used to detect a backup in the sewer system. Because prior art caps do not hold a detection and show no detection at night, sewer water levels may rise and descend for months before a detection is identified.

After working for the City & County of Honolulu for more then eight years, I came up with this invention that could prevent a home or business from a backup or prevent a major sewer spill in our community. My invention will notify the public prior to a complete blockage or a possible sewer spill. All previous cleanout caps and sewer backup indicator has a variety of disadvantages:

(a) Because some cleanout caps are made of one solid piece of material, it is not possible to determine where the problem resides. By not knowing where the problem lays, it definitely would waste valuable time and can become costly. If the problem were to be on the government side of the sewer system, it would not be the responsibility of the homeowner. However, if a homeowner were to call a private plumber than the homeowner would be responsible for plumbing costs.

(b) If the problem were to be on the private side and the government authorities were called, through my experience, valuable time again is wasted. In most cases, it is not the governments' responsibility to service or maintain the private side of plumbing of a home or business. Then a private plumber would have to be called to take care of the problem. Again, valuable time is wasted.

(c) Because no detection was made at an early stage of the problem and through my experience restaurants and businesses have been closed for a few hours to a few days and even weeks until the problem was resolved and therefore plumbing could not be used.

(d) In my experience homes have been flooded because a home located at the lower end of a main sewer line may receive sewer water from the homes located at a higher elevation. Because water will always level off, the home at the closes point up stream of the obstruction in the system will be like a release valve. In most cases the tub and toilet is the point of over flow. Once the water level exceeds the height of the tub and toilet, sewer waters will overflow into the home.

(e) Because the cleanout cap is the only part of the sewer system above ground level and is the closest to the property line of a private land owner, it is the first point of the system that could determine who is responsible for a backup in the system. Some caps are sealed and therefore, it is not possible to determine who should be called.

(f) Backups occur due to the volume of water flowing through a sewer pipe and the percentage of the pipe being obstructed. The obstructions in the pipe caused by roots, grease, grit or a damaged pipe, reduces the flow in the mornings peak hours between (5:00 am to 10:00 am) when people start their day. Water levels may rise due to the volume of water use of the public and the percentage of the pipe being obstructed. The levels descend as the volume of water entering system lessens after peak hours. The levels rise again at evening peak hours (4:00 pm to 10:00 pm) when people end their day. Because there is no detection made when water levels descend, water levels may rise and fall for weeks to months before any indication is identified of a backup or sewer spill.

(g) Main sewer lines are connected to sewer manholes and backups often fill sewer manholes with sewer water for blocks. But because manhole covers weigh about two hundred pounds and in some cases are equipped with a rain catcher which prevents infiltration of rain water, it also seals sewer water from exiting the sewer manhole that prevents a detection of a backup or a possible spill. Through my experience, living in the State of Hawaii where we are surrounded by ocean sewer spills have closed beaches, lakes, canals, and rivers, etc.

SUMMARY OF THE INVENTION

In accordance with the present popup backup indicator which is a device that responds to a physical stimulus and transmits an impulse, provides a quick detection and locate a possible sewer, day or night, at an early stage. This invention is an early stage detection before a backup occurs and prevents a sewer spill or a total blockage in the plumbing of a home or business. This popup sewer backup indicator prevents sewer spills that threaten our waterways and prevents the endangerment of wildlife such as plants, animals and aquatic life, which this invention basically, protects our environment and our water supply.

OBJECTIVES AND ADVANTAGES

Besides the objectives and advantages of the pop up sewer backup indicator that responds to a physical stimulus and transmits an impulse, as described in the above patent, several objectives and advantages of the present invention are:

(a) to provide a popup sewer backup indication with a device that will detect a problem in the sewer system.

(b) to provide a public friendly popup sewer backup indicator that will detect a high water level keep a continuous detection that is obvious during the day or night even if water level where to recede.

(c) to provide a popup sewer backup indicator that will determine who is responsible, private homeowner or the government before a spill occurs.

(d) to provide a sewer backup indicator that will save private homeowners or business an unnecessary bill from a private plumber and by informing the public that they may not be responsible for the problem.

(e) to provide a sewer backup indicator with an extremely obvious sight indication to the public, day and night.

(f) to provide a sewer backup indicator that may prevent a restaurant or business that rely on water from not being able stay in operation, because plumbing cannot be used.

(g) to provide a sewer backup indicator that will detect a problem in the sewer system at an early stage, allowing time for maintenance or repairs to be made before the problem progresses into a more serious stage.

(h) to provide a sewer backup indicator that may prevent homes located at the lower end of the sewer system and bottom units of an apartment or condo from being flooded by sewer water.

(i) to provide a sewer backup indicator that prevents schools and public facilities from being closed due to unsanitary conditions.

(j) to provide a sewer backup indicator that may prevent a major sewer spill causing hundreds of gallons or thousands of gallons of raw sewage that could enter streams, rivers, lakes, beaches and communities, which causes these public placed to be closed.

(k) to provide an inexpensive system that will canvass a, community, that will monitor sewer water levels in sewers, while having the publics help identifying problems in the sewers and help protect our environment.

(l) to provide a sewer backup indicator that will assist the sewer department or sanitary district save time in locating where the problem in the sewer system would most likely be, after receiving the call. For example, if a sewer worker got a call about slow drainage from a home on block B, when he arrives he notices that the indicator is in its neutral position, because there is no pressure against the indicator, the problem is at the private side of the plumbing.

(m) to provide a sewer backup indicator that will help the sewer department or sanitary district save time in locating were the problem in sewer system would most likely be after receiving the call. The worker arrives at the location and he notices that a sewer backup indicator sewer backup indicator on block B, has an indication and all other indicators on that block are in their neutral position, then it would most likely be that the problem is in the sewer lateral connecting the home on block B, to the main sewer line. He then can decide what is the most efficient equipment to use to resolve the problem.

(n) to provide a sewer backup indicator that will assist the sewer department or sanitary district save time locating were the problem in the sewer system would most likely be after receiving the call. For example the worker arrives at the location he notices that the indicators on block B, C and D is erected but the indicators on block A and E were in it's neutral position. By examining his map he finds that block E is the upstream and flows down stream to block A. He also notices that the first ten homes at the lower end of the sewer system on block B, is in the neutral position and the other ten homes on block B, is in its erected position. He will know that the problem is in the main sewer line between the $10^{th}$ and $11^{th}$ house on block B, he then determines the most efficient manhole and equipment he will use to release the problem, before a spill begins.

(o) to provide a sewer backup indicator that will basically help protect our environment and our water supply.

In general, the popup sewer backup indicator replaces the existing cleanout caps that will save the government and homeowners money from unnecessary bills along lawsuits from the E.P.A for sewer spills. The popup sewer backup indicator will easily locate the location where the problem resides without opening any part of the sewer system. Furthermore, this invention will also prevent the closing of public access to lakes, rivers, and beaches that include the endangerment of plants, wildlife, aquatic life and protecting our environment and water supply.

BRIEF DESCRIPTION OF THE SEVERAL VIEWS OF THE DRAWINGS

FIG. 1 shows a side view of pop-up sewer backup indicator fully assembled in a neutral position.

FIG. 2 shows a top view of my invention fully assembled in a neutral position.

FIG. 3 shows a side sectional view of my invention attached to a sewer cleanout cap housing fully assembled in an erected position with sewer water levels high with an inner body extension attached.

FIG. 4 shows a top view of my invention excluding the top flange and cylindrical body section.

FIG. 5 shows a below ground view of the pop-up sewer indicator attached to a sewer cleanout cap housing fully assembled in full operation indicating a backup.

REFERENCE NUMERAL IN DRAWINGS

| | |
|---|---|
| 1 | cylindrical housing |
| 3 | inner body |
| 5 | seal |
| 7 | top flange (having a bright color) |
| 9 | bottom brake |
| 11 | seal-rings |
| 13 | channels |
| 15 | threads |
| 17 | reservoir |
| 19 | glowing device |
| 21 | aperture |
| 23 | water-resistant glue |
| 25 | lubricant |
| 27 | cleanout cap housing |
| 29 | private side of plumbing |
| 31 | beginning of sewer system |
| 33 | liquid under pressure |
| 35 | recess |
| 37 | notch |
| 39 | pin |
| 41 | Flange seat |
| 43 | bottom brake threads |
| 45 | pressure seal |
| 47 | additional brake |
| 49 | inner body extension |
| 51 | safety screws |
| 53 | barrier |

DETAILED DESCRIPTION OF THE INVENTION

Provisional Application Filling date: Feb. 8, 2003. Provisional Application Number: 60/445,863. International Application No. PCT/US2004/003777. A cylindrical housing 1 is illustrated in FIG. (1) that is made of a rigid material, such as ABS (Aciryalonitrile-Butadiene-Styrene) or PVC (Poly-Vinyl-Clorite). However, cylindrical housing 1 consists of metals, plastics, or a combination of other materials. Cylindrical housing 1 is comprised of external threads 15, an aperture 21, channels 13, and recess 35, as shown in FIG. (3). Seal 5, which is made of a durable material or a combination of other materials, will withstand the atmosphere of the sewer systems. These materials can be foam, sponge, rubber, plastic, or cork. Seal 5 is attached to the inner wall of cylindrical housing 1 between seal-rings 11 of the cylindrical housing 1 that uses a water-resistant glue 23, as shown in FIG. (3). Seal 5 is then primed by applying a lubricant 25 on the inner section of seal 5.

A inner body 3 is also made of a rigid material or a combination of materials, such as PVC, ABS, metals or plastics inner body 3, comprising of a top flange 7 (having a bright color) and threads 15, at the bottom end of said inner body 3 for the connection of bottom brake 9, as shown in FIG. (3). Inner body 3 is first lubricated using lubricant 25 along the entire length of the inner body 3, then the bottom end of cylindrical body 3 is inserted through the cylindrical housing 1, aperture 21, and seal 5, as shown in FIG. (3). The length of the inner body 3 is determined by the depth of the service line of the private side of plumbing 29 as shown in FIG. (5). The inner body 3 or any part of the indicator should not interfere with the existing sewer flow. A glowing device 19 such as pigment, tape, or paint, (having a bright color to set against color from the top flange 7 is attached and located directly under top flange 7, of the inner 3, by means of adhesives, fastening means, as shown in FIG. (3, 5). A bottom brake 9, also made of a rigid material such as PVC, ABS, plastics, and metals is attached to the bottom section of inner body 3, by fastening means such as corresponding threads 15, as shown in FIG. (3). An additional brake 47 that is made of a rigid material may be attached to a desired location of the inner body 3, to restrict the movement of inner body 3 and to customize a desired elevation using fastening means such as water-resistant glue 23, as shown in FIG. (3). A pressure seal 45 is made of durable material such as rubber, foam, or plastic is fastened to the top of bottom brake 9, or additional brake 47, using water-resistant glue 23, as shown in FIG. (3). Inner body extension 49, made of a light and buoyant material such as plastic or foam, which is an optional component that may be fastened to the bottom brake 9, using fastening means to use water-resistant glue 23 and safety screws 51, as shown in FIG. (3). Lubricant 25 is poured into a reservoir 17, through aperture 21, space between the inner body 3, and the cylindrical housing 1, from the reservoir 17 that holds the lubricant 25, as shown in FIG. (3). Inner body 3 is then pushed in a downward direction until the top flange 7, sits in the recess 35, which is held in position by a flange seat 41. The recess 35 allows my invention to have a level plain with the top surface of cylindrical housing 1, as shown in FIG. (1). A notch 37 allows the pin 39 to be fastened below the flat plain at the top flange 7, as shown in FIG. (3). A lubricant 25, such as grease is applied to the bottom of the top flange 7, and the top of flange seat 41, which will prevent debris from entering the reservoir 17 and prevent any restriction of movement. My invention is then installed by applying grease, anti-cease, lubricant 25 to the cleanout cap housing 27, by screwing the cylindrical housing 1 into the cleanout cap housing 27 that uses the corresponding threads 15 and channels 13. The channels 13 is a means of clenching and the cylindrical housing 1 with a hammer and chisel to tighten the cylindrical housing 1 into cleanout cap housing 27. The barrier 53, located at the top of cylindrical housing 1 separates channels 13 and the aperture 21 that also prevents debris from entering the reservoir 17. Keeping reservoir 17 and lubricant 25 free of contaminates.

DESCRIPTION OF THE OPERATION

The advantage of using my invention is to indicate that the water in the sewer is above the normal level and holds the detection until an investigation is made to determine the cause of the backup at an early stage. My invention is fully assembled in a neutral position as shown in FIG. (1). My invention is installed by screwing cylindrical housing 1 into a sewer cleanout cap housing 27, as shown in FIG. (3, 5). Channels 13 are used clenching and tap cylindrical housing 1 firmly utilizing a tool such as a hammer and a chisel. The barrier 53 separates channels 13 and aperture 21 that prevents foreign matters from entering the reservoir 17, as shown in FIG. (3). The top flange 7 prevents the inner body 3 from descending and separating from the cylindrical housing 1 while in a neutral position as shown in FIG. (1). The notch 37 allows the pin 39 to be set below the top surface of the top flange 7, shown in FIG. (1) while the recess 35 and the flange seat 41 allows the top flange 7 to sit within the surface of the cylindrical housing 1, producing a level plain as shown in FIG. (1). The bright color of top flange 7 gives a clear distinction of the location of the sewer indicator on a property. The lubricant 25 lubricates the inner body 3 and the seal 5 in a two set maintenance procedure without removing the sewer indicator from the cleanout cap housing 27 by pulling the inner body 3 using pin 39 in an upward position to its full extension as shown in FIG. (5), the lubricant 25 within reservoir 17 coats the inner body 3 when pulled in an upward position and lubricates the seal 5 when pushed back into its neutral position, as shown in FIG. (1). When a back up occurs, the water level will force the inner body 3, to go from flaccid to firm as shown in FIG. (5). Seal 5 seals the sewer water from exiting the sewer indicator and hold the inner body 3 in an elevated position even if the water level recedes to its normal stage, as shown in FIG. (5). The seal-rings 11 secures seal 5 in position and the circumference of seal-rings 11 prevents the passage of the bottom brake 9 which prevents the separation of the inner body 3 from cylindrical housing 1. The glowing device 19 (having a bright color to set against the bright color of top flange 7) allows a minimal lift of inner body 3 to be an obvious indication during the day and even more obvious indication from a farther distance at night. The bottom brake 9 seals the bottom of the inner body 3, making it buoyant. The bottom brake threads 43 allow the inner body 3 to be detached from the cylindrical housing 1. Should repairs be needed on the cylindrical housing 1 or inner body 3, one may be reinstalled while the other is replaced. The additional brake 9 prevents inner body 3 from separating from the cylindrical housing 1, when under pressure from a backup. Being that sewer uses gravity flow, the location of the cleanout cap housing 27 may differ from property to property. The additional brake 47 may be used if needed to control the ascent of the inner body 3, should the sewer backup indicator be located in driveways or walkways, as shown in FIG. (3). The pressure seal 45 that may be used on either brake gives an additional seal to the sewer indicator. As the pressure forces the inner body 3 in the upward direction the pressure seal 45 performs as a gasket between the cylindrical housing 1 and additional brake 47. The greater the pressure, the greater the seal that will prevent sewer water from exiting the sewer indicator, as shown in FIG. (3). As mentioned earlier, being that underground plumbing differs from property to property, an inner body extension 49 may be fitted for each application and attached to the bottom brake 9 to allow the bottom of the sewer backup indicator, which is to be positioned just above the normal sewer flow. This is to adjust the sensitivity of the sewer indicator so that just a minimal rise of sewer flow will show a detection. An application of the lubricant 25 is applied between the top flange 7 and recess 35 which eliminates restriction, when an ascent occurs and to restrict contaminates from entering the sewer indicator. Once the problem has been identified and resolved, the indicator is reinstalled and set back to its neutral position. If a major repair is needed but is not feasible at that time, due to permits and planning, this invention will keep a close eye on the situation until the repairs are completed.

What I claim as my invention is:

1. A popup sewer backup indicator for connection to a cleanout housing to indicate when a backup has occurred, said popup sewer backup indicator comprising:
   a) an outer housing having a connection means for attachment to a cleanout housing, said outer housing having a top and a bottom wherein a vertical opening extends from the top to the bottom,
   b) an elongate buoyant inner body being positioned within said vertical opening for vertical movement and having a lower neutral position and an upward indicating position, said inner body having a top flange,
   c) the top of said outer housing includes:
      a brake seat that allows the top flange to be recessed within the top of said outer housing when the buoyant inner body is in the lower neutral position,
      channels along the top of said outer housing that form a means to clench the popup sewer backup indicator for installation and removal from the cleanout housing,
      a lubrication reservoir, and
      a barrier,
      wherein the brake seat and the channels are separated from the reservoir by the barrier to prevent contaminates from entering the reservoir.

2. The pop-up sewer backup indicator of claim 1 wherein the bottom of the outer housing includes a seal for sealing sewer water from exiting the popup sewer backup indicator, and wherein upon upward movement of the inner body to the upward indicating position the seal holds the inner body in the upper indicating position for indicating that a backflow has previously occurred.

3. The pop-up sewer backup indicator of claim 2 wherein a top surface of the top flange has a notch with a pin therein for manually erecting said inner body for lubricating said inner body and said seal.

4. The pop-up sewer backup indicator of claim 2 wherein the bottom of the inner body includes a bottom brake which provides a stop to limit a maximum upward movement of the inner body.

5. The pop-up sewer backup indicator of claim 4 wherein an additional brake having a pressure seal at the top thereof is attached on the inner body between said bottom brake and said bottom of the outer housing,
   said additional brake providing an adjustable stop for reducing the maximum upward movement of the inner body,
   said pressure seal providing an additional means for sealing sewer water from exiting the popup sewer backup indicator.

6. The pop-up sewer backup indicator of claim 4 further including an inner body extension wherein the inner body extension is attachable to a bottom of the bottom brake for extending the length of the inner body to accommodate the normal level of sewer flow.

7. The pop-up sewer backup indicator of claim 6 further including safety screws to secure, or to assist in securing, the bottom brake and the inner body extension.

8. The pop-up sewer backup indicator of claim 4 further including seal rings, said seal rings securing the seal in position and prevents the passage of the bottom brake.

9. The pop-up sewer backup indicator of claim 2 further including seal rings, said seal rings securing the seal in position.

10. The popup sewer backup indicator of claim 1 wherein the top flange is brightly colored and the inner body is brightly colored adjacent the top flange.

11. The popup sewer backup indicator of claim 10 wherein the color of the inner body relative to the color of the top flange is different, glows, or is different and glows.

12. A popup sewer backup indicator for connection to a cleanout housing to indicate when a backup has occurred, said popup sewer backup indicator comprising:
  a) an outer housing having a connection means for attachment to a cleanout housing, said outer housing having a top and a bottom wherein a vertical opening extends from the top to the bottom,
  b) an elongate buoyant inner body being positioned within said vertical opening for vertical movement and having a lower neutral position and an upward indicating position, said inner body having a top flange and a bottom,
  c) a brake seat located at the top of said outer housing, the brake seat allowing the top flange to be recessed within the top of said outer housing when the buoyant inner body is in the lower neutral position,
  d) a bottom brake located at the bottom of the inner body, said bottom brake providing a stop to limit a maximum upward movement of the inner body,
  e) an additional brake attached to the inner body between said bottom brake and said bottom of the outer housing, said additional brake providing an adjustable stop for reducing the maximum upward movement of the inner body, said additional brake having a pressure seal at a top thereof wherein said pressure seal provides a means for sealing sewer water from exiting the popup sewer backup indicator.

* * * * *